J. B. SEMPLE.

PROJECTILE.

APPLICATION FILED FEB. 16, 1912.

Reissued Apr. 16, 1912.

13,406.

2 SHEETS—SHEET 1.

WITNESSES:

J. Herbert Bradley

Louis Jones

INVENTOR

John B. Semple by Christy and Christy

Atty's

J. B. SEMPLE.

PROJECTILE.

APPLICATION FILED FEB. 16, 1912.

Reissued Apr. 16, 1912.

13,406.

2 SHEETS—SHEET 2.

WITNESSES:

J. Herbert Bradley.

Louis Ionata

John B. Semple INVENTOR by Christy and Christy

Att'ys

UNITED STATES PATENT OFFICE.

JOHN B. SEMPLE, OF SEWICKLEY, PENNSYLVANIA.

PROJECTILE.

13,406. Specification of Reissued Letters Patent. Reissued Apr. 16, 1912.

Original No. 999,470, dated August 1, 1911, Serial No. 594,506. Application for reissue filed February 16, 1912. Serial No. 678,111.

*To all whom it may concern:*

Be it known that I, JOHN B. SEMPLE, residing at Sewickley, in the county of Allegheny and State of Pennsylvania, a citizen of the United States, have invented or discovered a certain new and useful Improvement in Projectiles, of which improvement the following is a specification.

In Letters Patent of the United States, No. 694,032, I have described and claimed an ignition device for a combustible charge carried by a projectile, and operated, after the projectile leaves the muzzle of the gun from which it is fired, by the expansive power of the gases generated within the gun on the explosion of the propelling charge.

My present invention consists in a device superadded to the device of my earlier patent referred to, which, while serving as a guard or safety attachment to prevent the accidental operation of the ignition device, ceases to be effective when the projectile is fired, and leaves the ignition device free to operate in its normal manner, described in the said patent.

It has been found in the use of projectiles equipped with the ignition device of my said earlier patent, that the ignition device may be accidentally discharged, as by a more than ordinary fall of the projectile or of a cartridge containing it; and it is against such accidents that I guard, by the device of my present invention.

Figure 1:
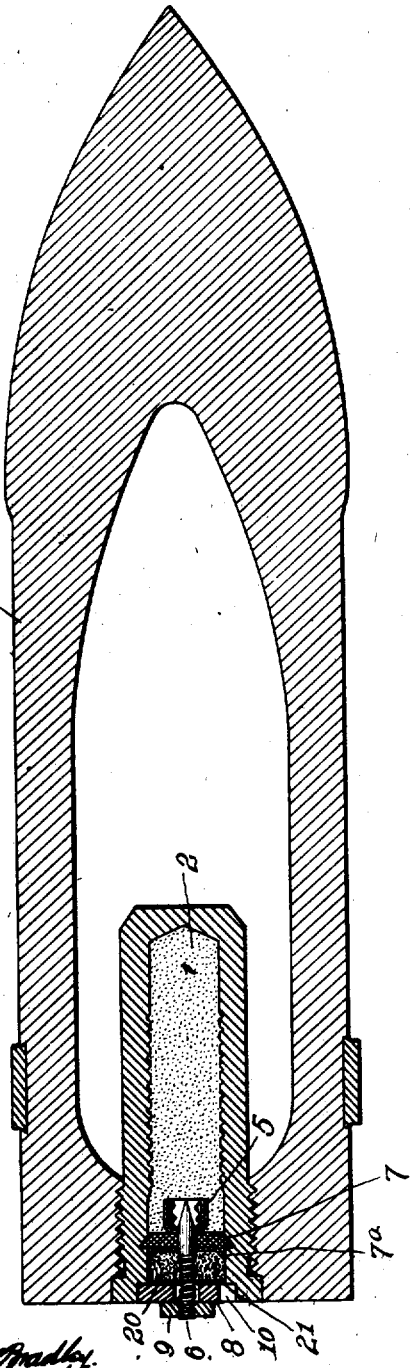
Figure 3:
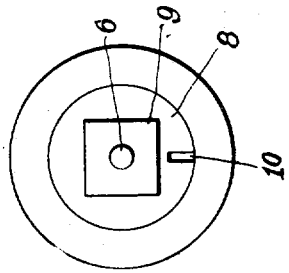
Figure 2:
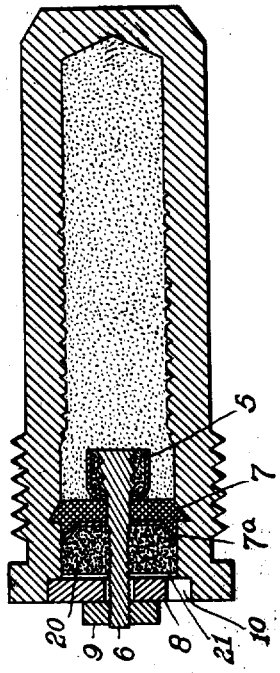
Figure 4:
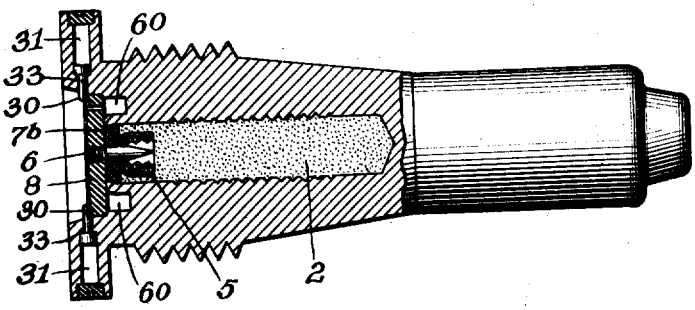
Figure 5:
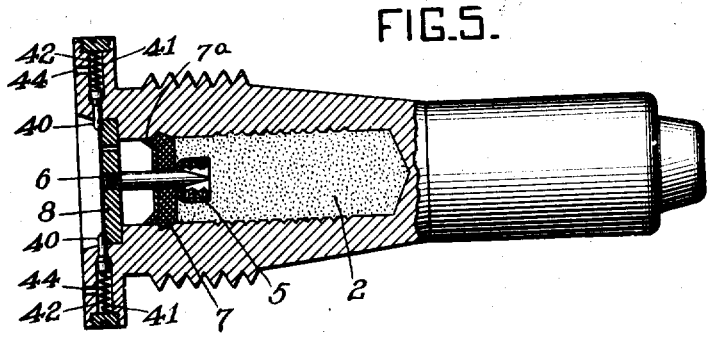
Figure 6:
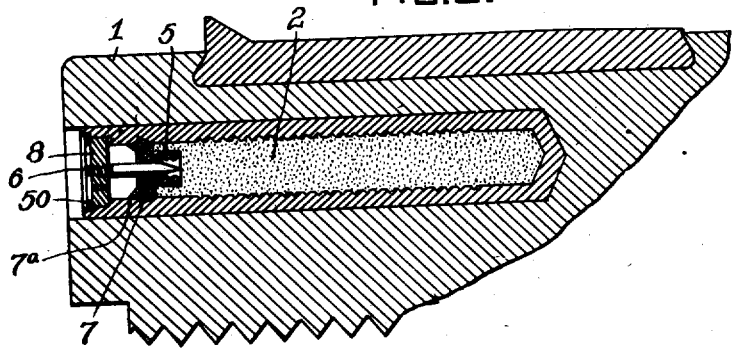

In the accompanying drawings, which form part of this specification, Figure 1 is a view in longitudinal section of a projectile provided with a "tracer" and having an ignition device such as is described and claimed in my prior patent referred to above, No. 694,032, to which ignition device the safety attachment which constitutes my present invention is applied; Fig. 2 is a like view, but on larger scale, of the detached "tracer", with its ignition device and safety attachment; and Fig. 3 is a plan view of the base of the "tracer" on equal scale with Fig. 2. Figs. 4 and 5 are views corresponding to Fig. 2, but illustrating my invention in modified forms. Fig. 6 is a fragmentary view in longitudinal section, and on a scale more nearly corresponding to Fig. 1, of a projectile, carrying in its base an eccentrically placed "tracer", with its ignition device provided with the safety device of my present invention; and in this instance a further alternative form is shown.

Referring to Figs. 1, 2, and 3 of the drawings, the projectile 1 (in this instance an explosive shell) will be seen to be equipped with a tracer; this tracer consisting of a charge of combustible material contained in a chamber 2, carried in the body of the projectile and opening to the rear thereof. The body of combustible material within the chamber 2 burns during the flight of the projectile, and, as it burns, affords means by which the gunner may follow, with his eye, the path of flight. The ignition device, by the operation of which the charge of combustible material is ignited as the projectile leaves the gun, consists of a plate 8, a frictionally ignited primer 5, and a primer rod 6. The plate 8 closes a chamber formed in the body of the projectile, in this case a space rearward of the tracer charge within chamber 2, and a gas passageway is provided, preferably as a perforation or passageway 10 through the plate 8 itself, to the chamber closed by the said plate. The primer 5 is embedded within the charge of combustible material, which charge is held to the anterior end of the chamber 2 by a plate or wad 7; and the primer rod 6 extends across the interval which separates the plate 8 from the wad 7. The inner end of the rod extends within the primer 5, where it is enlarged and roughened, and its outer end engages the plate 8, as by a nut 9. Upon the explosion of the propelling charge at the rear of the projectile, gases under enormous pressure gain access through the passageway 10 to the interval, which lies within chamber 2, between plate 8 and wad 7. The projectile leaves the gun with this space filled with highly compressed gases. Immediately on the passage of the projectile from the muzzle of the gun, the pressure to rearward of plate 8 is relieved; and, since the gas passageway 10 is insufficient in size to afford immediate relief, the pressure of gases confined in front drives plate 8 rearward from its seat in the projectile, and in so doing draws primer rod 6 rearward, through the wad 7, and fires the primer 5; thereafter, as the projectile flies, combustible material stored in chamber 2 burns and affords the light or smoke by which its path and striking point may be traced.

I have found that the ignition device, which I have here briefly described, and which is described at greater length in my said earlier Patent, No. 694,032, is liable to accidental ignition, there being no means, external to the ignition device itself, for holding plate 8 in place. Because of its mass, plate 8 may be accidentally displaced by a shock or jar incident to handling projectiles or cartridges, and the ignition device prematurely fired. My invention consists, as stated above, in means for guarding against such accident; and, in Figs. 1, 2, and 3, my preferred means to that end are illustrated. Generally stated, my invention consists in providing means for preventing accidental movement of any parts which would cause the premature ignition of the tracer charge, the said means being adapted to be rendered ineffective by forces, such as heat, pressure, or movement, generated by or due to the combustion of the propelling charge in a gun. More specifically, it consists in an additional obstruction to the rearward movement of plate 8, this additional obstruction being removed on and by means of the firing of the propelling charge within the gun. In the form of the invention shown in Figs. 1, 2, and 3, this means or obstruction consists of a body of combustible substance 20 (black powder for example) compressed into the interval within chamber 2 between the wad 7 and the plate 8, and engaging both the chamber wall and the shank of primer rod 6, which last named member will preferably be roughened, as shown, to increase the hold of the filler upon it. Upon the explosion of the firing charge, the flames of explosion will gain access through the passageway 10 and set fire to the filler 20, which will immediately burn away, and the projectile will pass from the muzzle of the gun with this space, previously occupied by filler, now occupied by highly compressed gases, substantially as though the interval had been initially an empty air space. The further operation of the ignition device will be precisely what it was before my present invention was superadded to it.

In the specific embodiment of the invention which is shown in Fig. 4, the additional obstructions to the rearward displacement of plate 8 are pins or bolts 30 (there are preferably two or more of them) movable radially with respect to plate 8, in chambers 31 formed to receive them in the head of the tracer stock. These chambers 31 are so arranged and the bolts 30 are, in the assembling of the parts, so placed that normally they overlap the edge of the plate 8 to the rear thereof. That the bolts may be brought securely to place in the assembling of the parts, small beveled grooves are preferably made in the rim of plate 8, and the bolts 30, advanced upon these beveled surfaces, bind thereon. Further, as shown, the plate-engaging tips of these bolts are preferably of reduced size, while their enlarged bodies normally engage packing rings 33 of lead or other material within the correspondingly shaped chambers 31. The pressure of the propelling charge drives these bolts outward along chambers 31, thus leaving plate 8 free to perform its normal operation.

In the specific construction shown in Fig. 5, the bolts 40 (which have the same office as pins 30 of Fig. 4) are arranged to be driven outward, not as the bolts 30 of Fig. 4, by the pressure of gases, but by the centrifugal force of the rotating projectile. Accordingly, the chambers 41, in which these bolts 40 are movable, are in substantially free communication with the powder chamber, as by passageways 44, and the bolts are initially held in advanced position by backing springs 42.

The obstruction to rearward movement of the plate 8, in the form shown in Fig. 6, consists in a fusible or combustible metal or smokeless powder, preferably in the form of a ring 50, carried in the body of the projectile or of the tracer stock, and overlapping plate 8 to the rear. The heat of the explosion of the driving charge will immediately destroy this stop and leave plate 8 free to operate in normal manner.

It will be observed of these several embodiments of my invention that there is in each instance a corporeal obstruction to the movement of plate 8, effective up to the time of the explosion of the driving charge; and that, in each instance, the obstruction is removed by the energy made active in the explosion. In the specific forms of the invention, shown in Figs. 1–3 and 6, it is the heat of the gases of explosion which is the effective means of removing the obstruction; in Fig. 4 it is the pressure of the gases which effects the end, and again in Fig. 5 it is the expansive power of the gases which withdraws the bolts, made effective however to this end by the rotation of the projectile as it is fired from a rifled gun.

The structure of Fig. 5 will be fully effective only in case the plate 8 is concentric with the projectile itself; the structures of the other figures do not depend for their operation on the exact position which they occupy in the rear surface of the projectile, and may be placed either centrally or laterally, as will be understood on comparing Figs. 1 and 6.

In Figs. 1, 2, 5, and 6 the wad 7, which holds the tracer charge to the anterior end of chamber 2, is shown to be dovetailed in the wall of this chamber. This is my preferred construction, the wad being in this case formed of an easily fusible metal; the dovetailing holds the wad in place, and as the tracer compositoin burns the wad will gradually be melted away and the orifice, through which the tracer burns, gradually enlarged. In such case the wad 7 is preferably faced rearwardly by a plate 7[a] of refractotry character, formed for example of brass or steel, to shield it against the blast of incandescent gases, which, on the explosion of the propelling charge, enters port 10, and which would otherwise perforate the wad 7 at once.

When the packing or filler 20 of Figs. 1-3 is employed, it will preferably not fill completely the space between the wad 7 and the plate 8, but, as indicated in the drawings, a small space 21 will be left at the rear in which the flames may have more ready access to the filler. The rear surface of the filler will preferably be coated with shellac to exclude moisture.

Fig. 4 illustrates a further modification, and one which reduces the necessary dimensions of the tracer chamber and accordingly adapts it better to the conditions of certain applications. The chamber for the reception of the gases, which, as the projectile leaves the gun, are effective to blow plate 8 from its seat, is not, in this instance, the rear portion of the chamber which contains the tracer composition (as it is in the other figures), but is a separate chamber 60, laterally placed with respect to the main tracer chamber, and is preferably, as shown, an annular chamber formed in the stock of the tracer and surrounding the main chamber. In this case the wad 7[b] lies in immediate contact with plate 8, and the length of primer rod 6 is correspondingly reduced. The lip of the opening of the chamber is preferably swaged over, as is indicated in Fig. 4, to retain wad 7[b], as in the other instances it is retained by dovetailing.

I have described my invention in its application to an ignition device for a tracer. It will be understood, as is explained in my earlier patent referred to, that the fact that the ignition device is, for purposes of illustration, shown in connection with a tracer is immaterial. Such an ignition device is adapted to the ignition of substances within a flying projectile other than a charge of tracer compound; and, whatever be the specific use of this ignition device, my safety attachment, which constitutes the present invention, is applicable to it.

I claim herein as my invention:

1. The combination of a projectile provided with a chamber opening at the rear of the projectile, a combustible non-explosive pyrotechnic compound arranged in said chamber, means for igniting said compound on the discharge of a gun and after the passing of the projectile from the muzzle thereof, and means, rendered ineffective on and by the discharge of a gun, for normally preventing operation of the said ignition means, substantially as described.

2. The combination with a projectile provided with a chamber, of a movable member adapted to be shifted by the expansion of the gases stored in said chamber, an igniter operated by said movable member, and means, rendered ineffective on and by the discharge of a gun, for normally holding said movable member from movement, substantially as described.

3. The combination of a projectile provided with a chamber containing combustible material, a friction primer for igniting said material, means operative to ignite the primer on reduction of the propelling pressure against the projectile, and means normally effective to prevent ignition of said primer, but rendered ineffective by the discharge when the projectile, equipped therewith, is fired from a gun.

4. The combination of a projectile, an ignitible substance carried thereby, an ignition device carried by said projectile, and means, rendered ineffective by heat, for normally preventing operation of said ignition device and carried by the projectile in a position exposed to the heat of discharge when the projectile is fired from a gun, substantially as described.

5. The combination of a projectile, an ignitible substance carried thereby, an ignition device carried by said projectile, and a member formed of combustible material normally preventing operation of said ignition device and carried by the projectile in a position exposed to the heat of explosion when the projectile is fired from a gun, substantially as described.

6. The combination of a projectile provided with a chamber, a port for the entrance of gases to said chamber, a movable member adapted to be shifted by the expansion of gases stored in said chamber, a primer ignitible by movement of said movable member, and a member opposing by its own body the movement of said movable member and itself removable from such opposing position by or through the discharge, when the projectile equipped therewith is fired from a gun, substantially as described.

7. In combination with a projectile carrying an ignitible substance, of an ignition device including a member normally closing a chamber in said projectile and provided with connection to an ignition primer, such connection extending through said chamber, a combustible packing within said chamber engaging at once the chamber wall and the aforesaid connection, and a gas passageway to said chamber, substantially as described.

8. A projectile, an ignitible substance carried thereby, an ignition primer lying within said body of ignitible substance, a movable member, operative connection between said movable member and said ignition primer, means rendered ineffective by the firing of said projectile from a gun for preventing movement of said movable member, and means for applying the expansive power of gas to shift said movable member on the firing of said projectile from a gun and after the passing of the projectile from the muzzle thereof, substantially as described.

9. A projectile, provided with a chamber opening to the rear thereof, a body of tracer material held by a fusible wad to the anterior end of said chamber, a space within said chamber and to the rear of said wad, a gas passageway leading to said space, and a facing of refractory material covering the rear surface of said wad, substantially as described.

10. A projectile provided with a chamber opening to the rear thereof and closed rearwardly by a movable plate, a body of tracer material held by a fusible wad to the anterior end of said chamber, the wall of said chamber overlapping the margin of said wad to the rear thereof, means rendered ineffective on the discharge of the projectile from a gun for normally holding said plate in its position of closure for said chamber, and means for applying the expansive power of gas to move said plate on the firing of the projectile from a gun and after the passing of the projectile from the muzzle thereof, substantially as described.

In testimony whereof, I have hereunto set my hand.

JOHN B. SEMPLE.

Witnesses:
PAUL N. CRITCHLOW,
FRANCIS J. TOMASSON.